(No Model.)
C. R. RICHARDS.
TOOL FOR TRIMMING HEADS OF CARTRIDGE SHELLS.
No. 479,125. Patented July 19, 1892.
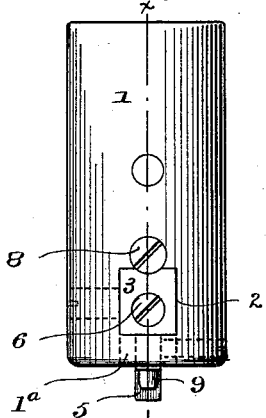
Fig. 1.
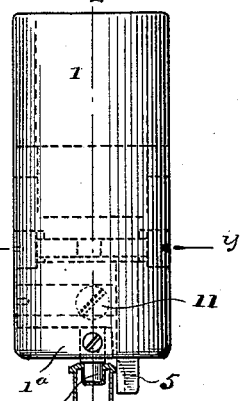
Fig. 2.
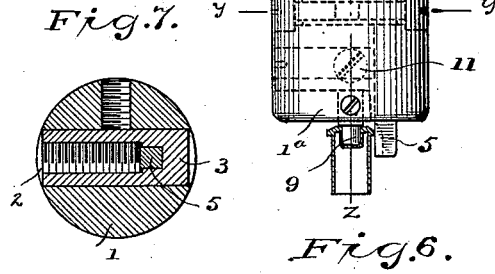
Fig. 7.
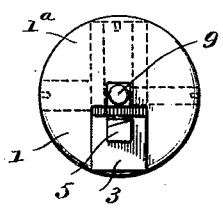
Fig. 3.
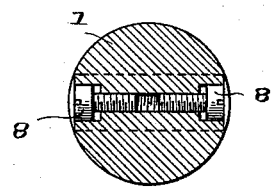
Fig. 6.
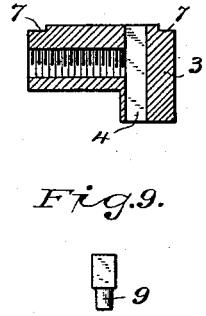
Fig. 4.
Fig. 9.
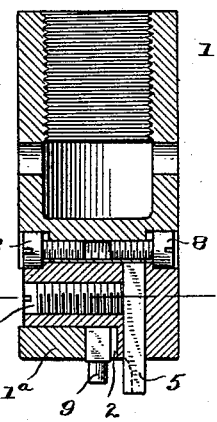
Fig. 5.
Fig. 8.
WITNESSES
H. A. Lamb
Edith G. Ely
INVENTOR
Charles R. Richards
By T. A. M. Wooster
Atty.

UNITED STATES PATENT OFFICE.

CHARLES R. RICHARDS, OF BRIDGEPORT, CONNECTICUT, ASSIGNOR TO THE UNION METALLIC CARTRIDGE COMPANY, OF SAME PLACE.

TOOL FOR TRIMMING HEADS OF CARTRIDGE-SHELLS.

SPECIFICATION forming part of Letters Patent No. 479,125, dated July 19, 1892.

Application filed February 8, 1892. Serial No. 420,739. (No model.)

*To all whom it may concern:*

Be it known that I, CHARLES R. RICHARDS, a citizen of the United States, residing at Bridgeport, in the county of Fairfield and State of Connecticut, have invented certain new and useful Improvements in Tools for Trimming Heads of Cartridge-Shells; and I do hereby declare the following to be a full, clear, and exact description of the invention, such as will enable others skilled in the art to which it appertains to make and use the same.

My invention has for its object to produce a tool for trimming heads of cartridge-shells, it being more especially adapted to trimming what are known as "swaged heads." It is of course well understood that in manufacturing this class of shells it is the practice to trim the edges of the shells for the purpose of giving uniformity and neatness to the finished shells, there being sufficient metal in the flanges to permit of their being trimmed down as much as may be necessary to give a finished appearance. In order that this operation may be performed automatically and at a high rate of speed, I have devised the novel tool of which the following description, in connection with the accompanying drawings, is a specification, numbers being used to designate the several parts.

Figure 1 is a side elevation of my novel tool complete; Fig. 2, a similar view, the body of the tool having been given a quarter-turn; Fig. 3, an inverted plan view; Fig. 4, a vertical section on the line $z\ z$ in Fig. 2; Fig. 5, a vertical section on the line $x\ x$ in Fig. 1; Fig. 6, a transverse section on the line $y\ y$ in Fig. 2, looking down; Fig. 7, a transverse section on the line $p\ p$ in Fig. 5, looking down; Fig. 8, a section of the tool-carrier detached; and Fig. 9 is a view of the centering-pin detached.

1 denotes the body of the tool, which is internally threaded for engagement with a mandrel, and is provided at its lower end with a recess 2, suitably shaped to receive a tool-carrier 3. The exact shape of the recess and the carrier is not of the essence of my invention. I preferably, however, construct the carrier L-shaped, substantially as shown in Fig. 8, the transverse recess 2 in the body extending entirely through it and just sufficient metal being removed at the lower end of the body to receive the carrying portion of the carrier, so that in fact the carrier is supported by the solid metal of the body, as at $1^a$. This tool-carrier is provided with a vertical recess 4, which receives the trimming-tool 5, said tool being locked in place by a set-screw 6. The tool-carrier is provided at its upper end with notches 7 and is adjustably secured in place by set-screws 8, it being simply necessary to loosen one set-screw and tighten the other to move the carrier and tool in either direction. After adjustment the tool-carrier is locked in place by a set-screw 11.

In use the tool and the cartridge-shell to be operated upon are centered by a pin 9, secured in a recess at the lower end of the body, where it is locked by a set-screw 10.

The operation of my novel tool will be clearly understood from Fig. 2. The cartridge-shell to be operated upon is held in any suitable manner and either moved upward to the tool or the tool is moved down to the cartridge-shell, the centering-pin engaging the usual primer-pocket in the bottom of the shell, whereby both shell and tool are centered and retained in position while the flange of the shell is being operated upon by the trimming-tool, the entire operation of trimming the head of a shell taking place in very much less time than it takes to describe it.

Having thus described my invention, I claim—

1. A tool for trimming heads of cartridge-shells, consisting of a revoluble body having at its lower end a recess adapted to receive a tool-carrier, suitable means for adjusting and locking said tool-carrier in position, a tool adapted to engage the head of a shell, and a pin adapted to engage the primer-pocket in the shell, whereby both tool and shell are centered.

2. A tool for trimming heads of cartridge-shells, consisting of a revoluble body having a transverse recess near its lower end, one end of which is cut through to the lower end of the body, an L-shaped tool-carrier lying in said recess and provided with notches 7, a tool adapted to engage the head of a shell, and set-screws engaging said notches, whereby the carrier and tool are adjusted.

In testimony whereof I affix my signature in presence of two witnesses.

CHARLES R. RICHARDS.

Witnesses:
A. M. WOOSTER,
EDITH G. ELY.